(12) United States Patent
Mankovskii et al.

(10) Patent No.: US 10,032,086 B2
(45) Date of Patent: Jul. 24, 2018

(54) METHOD AND SYSTEM FOR AUTOMATED DATACENTER FLOOR VOLUME CALCULATION APPLIED TO DATACENTER THERMAL MANAGEMENT

(71) Applicant: CA, INC., New York, NY (US)

(72) Inventors: Serguei Mankovskii, San Ramon, CA (US); Maria C. Velez-Rojas, San Jose, CA (US); Howard A. Abrams, San Mateo, CA (US)

(73) Assignee: CA, Inc., New York, NY (US)

( * ) Notice: Subject to any disclaimer, the term of this patent is extended or adjusted under 35 U.S.C. 154(b) by 357 days.

(21) Appl. No.: 14/663,175

(22) Filed: Mar. 19, 2015

(65) Prior Publication Data
US 2016/0277715 A1  Sep. 22, 2016

(51) Int. Cl.
| | | |
|---|---|---|
| *H04N 7/18* | (2006.01) | |
| *G06K 9/18* | (2006.01) | |
| *G06F 17/50* | (2006.01) | |
| *G06T 7/55* | (2017.01) | |
| *G06K 9/00* | (2006.01) | |

(52) U.S. Cl.
CPC ........... *G06K 9/18* (2013.01); *G06F 17/5004* (2013.01); *G06K 9/00771* (2013.01); *G06T 7/55* (2017.01)

(58) Field of Classification Search
CPC combination set(s) only.
See application file for complete search history.

(56) References Cited

U.S. PATENT DOCUMENTS

| | | | | |
|---|---|---|---|---|
| 2007/0095907 | A1* | 5/2007 | Robinson | G06Q 10/087 235/385 |
| 2010/0081921 | A1* | 4/2010 | Urban | G06F 19/327 600/424 |
| 2015/0317418 | A1* | 11/2015 | Sankarapandian | G06F 17/5009 703/1 |
| 2015/0363515 | A1* | 12/2015 | Singh | G06F 17/5004 703/1 |
| 2016/0114488 | A1* | 4/2016 | Mascorro Medina | B25J 9/1697 700/259 |

* cited by examiner

*Primary Examiner* — Janese Duley
(74) *Attorney, Agent, or Firm* — Vierra Magen Marcus LLP

(57) ABSTRACT

A system and method are disclosed for automatically updating a virtual model of a facility such as a datacenter, for example for use in maintaining an accurate thermal management plan. Photo images of the facility may periodically be captured. Thereafter, one or more image recognition algorithms may be run on the captured images to recognize positions and identities of equipment and structures in the facility. Using this information, the virtual model of the facility may be updated. In examples related to thermal management of a datacenter, once the virtual model of the facility is updated, the thermal management plan may be revised.

14 Claims, 8 Drawing Sheets

(Step 300)

(Step 306)

(Step 344)

METHOD AND SYSTEM FOR AUTOMATED DATACENTER FLOOR VOLUME CALCULATION APPLIED TO DATACENTER THERMAL MANAGEMENT

BACKGROUND

Datacenters are proliferating across the world with the increase in the use of technology, such as the Internet, virtualization and cloud computing. A datacenter can for example host thousands of servers in a small space, and can also provide simplified cabling, a controlled environment (such as air conditioning and fire suppression), redundant or backup power supplies and security. The servers are generally arranged in racks, which themselves may be arranged in aisles of the datacenter.

Heat load analysis has become one of the most critical aspects in performance management of datacenters. Electrical equipment produces heat, which should be removed to prevent the equipment temperature from rising to an unacceptable level. Most servers and other equipment found in a datacenter are air-cooled. Sizing a cooling system and devising a thermal management plan for a datacenter requires a detailed understanding of the amount of heat produced by the equipment and heat sources in the datacenter, together with an accurate layout of the equipment, heat sources, dividers and fluid flow paths.

Datacenters often have complex infrastructures and virtual three-dimensional models of datacenter floors are useful tools in developing a thermal management plan. Such virtual 3D models, which may for example be prepared as a CAD drawing, may be developed initially from the known initial floor plan and layout of datacenter equipment. The problem is that the layout of equipment within a datacenter generally changes over time. The state of structures affecting thermal management may also change over time. For example, partitions may be moved, and doors and vents may be periodically opened or closed.

As a result, virtual 3D models become outdated. Datacenters often handle this by overprovisioning the thermal management plan. This leads to the problems of excessive and inefficient thermal management of datacenters. Currently, cooling datacenter equipment is often as costly as the running of the equipment itself.

BRIEF SUMMARY

The technology proposed herein automatically updates a virtual model of a facility, for example for use in maintaining an accurate thermal management plan. In embodiments, photo images of a facility may periodically be captured. Thereafter, one or more image recognition algorithms may be run on the captured images. The image recognition algorithms may recognize any of a variety of visual identification indicia on equipment within the facility, including for example QR (quick response) or other codes, brand name or model and/or identifiable shapes of equipment. The image recognition algorithms may also be able to recognize structures affecting management of the equipment, as well as their positions.

Using this information, the virtual 3D model of the facility may be updated. In embodiments related to thermal management of a datacenter, once the virtual 3D model of the facility is updated, the thermal management plan may be revised for example using a known computational fluid dynamics (CFD) algorithm. In this way, the thermal management plan may be implemented in an optimal and efficient manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
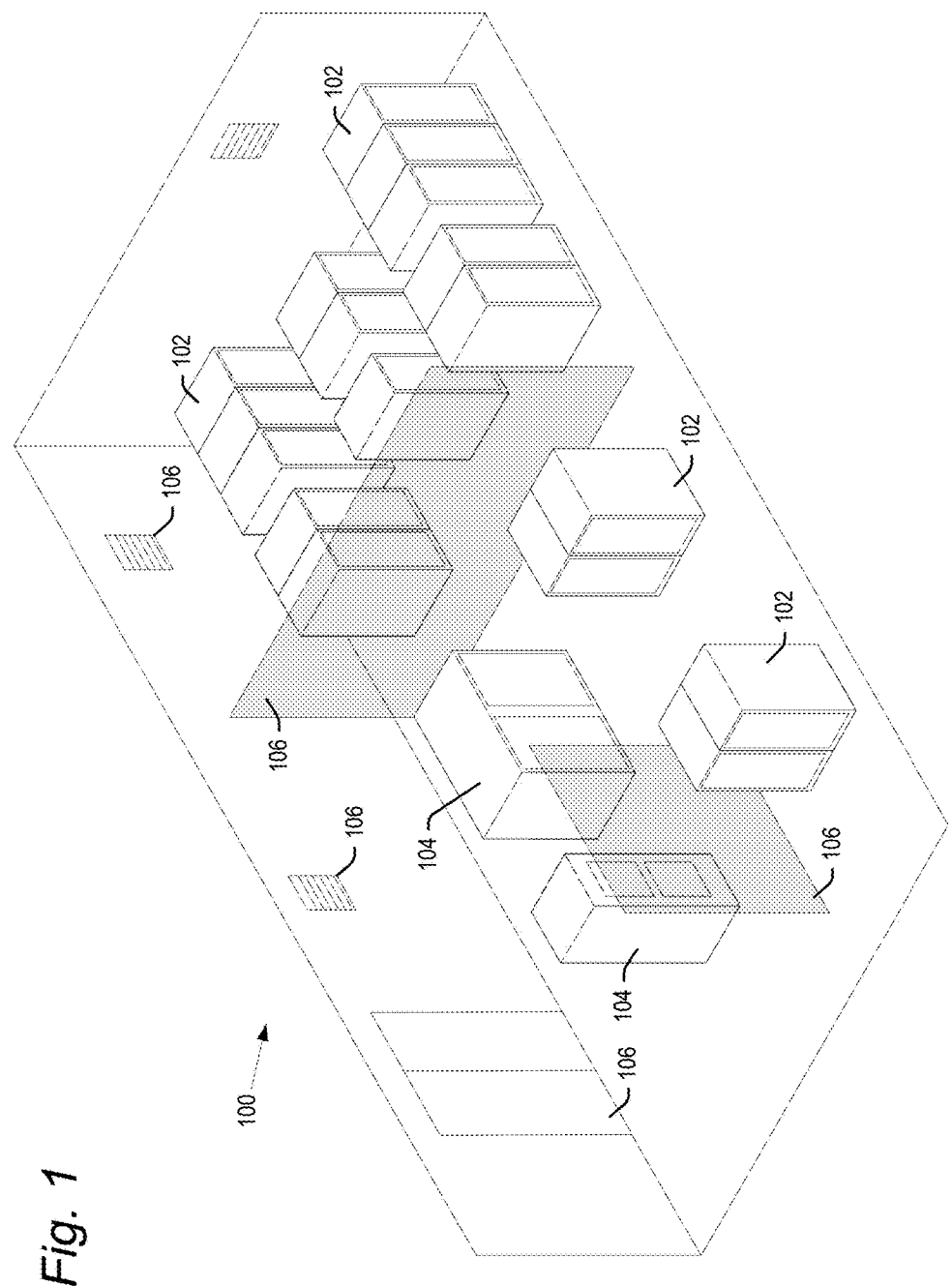
FIG. 1 is an image of a datacenter layout.

Embodiments of the present technology will now be described with reference to the figures, which in general relate to a system for automatically updating a virtual model of a facility, for example for use in maintaining an accurate thermal management plan. As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor other programmable data processing apparatus, or other devices to function in a particular manner, such that the instructions when stored in the computer readable medium produce an article of manufacture including instructions which when executed, cause a computer or processor to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present technology described below relate in general to a system for automatically updating a virtual model of a facility. In embodiments, that facility may be a datacenter. However, it is understood that the present technology may be used to update a virtual model of facilities other than datacenters, for example semiconductor and discrete component fabrication sites, assembly plants, factories, warehouses and other facilities. Additionally, in embodiments, the virtual model of facility, such as the datacenter, is updated for the purpose of updating and maintaining an accurate thermal management plan. However, it is understood that the present technology may use updated virtual models of the facility for updating other facility management plans, including for example updating the management of fabrication processes or updating the management of other operational parameters.

Referring now to FIG. 1, there is shown an example of a datacenter 100. In general, datacenter 100 is a facility housing a group of networked servers 102 for storage, processing and/or distribution of large amounts of data. The servers 102 may be arranged in aisles, rows, and/or stacked in columns. In addition to servers 102, datacenter 100 includes a variety of components 104 for redundant data communications connections, redundant or back up power supply, security systems and environmental controls for thermal management of the center 100 and fire suppression. Components 104 may for example include data networking devices, telecommunications devices, data storage devices, routers, gateways, equipment racks, power supplies, wiring, environmental controls such as HVAC, fire suppression equipment, and/or various security devices. The servers 102 and components 104 are collectively referred to herein as datacenter equipment or simply equipment. In addition to the equipment, the datacenter 100 may include structures 106 supporting or otherwise affecting thermal management of the equipment. These structures 106 may include for example doors, air vents, flooring and partitions such as stationary and movable walls. It is understood that the configuration of datacenter 100 shown in FIG. 1 is by way of example only. Other configurations may have more equipment, rooms and floors.

Figure 2:
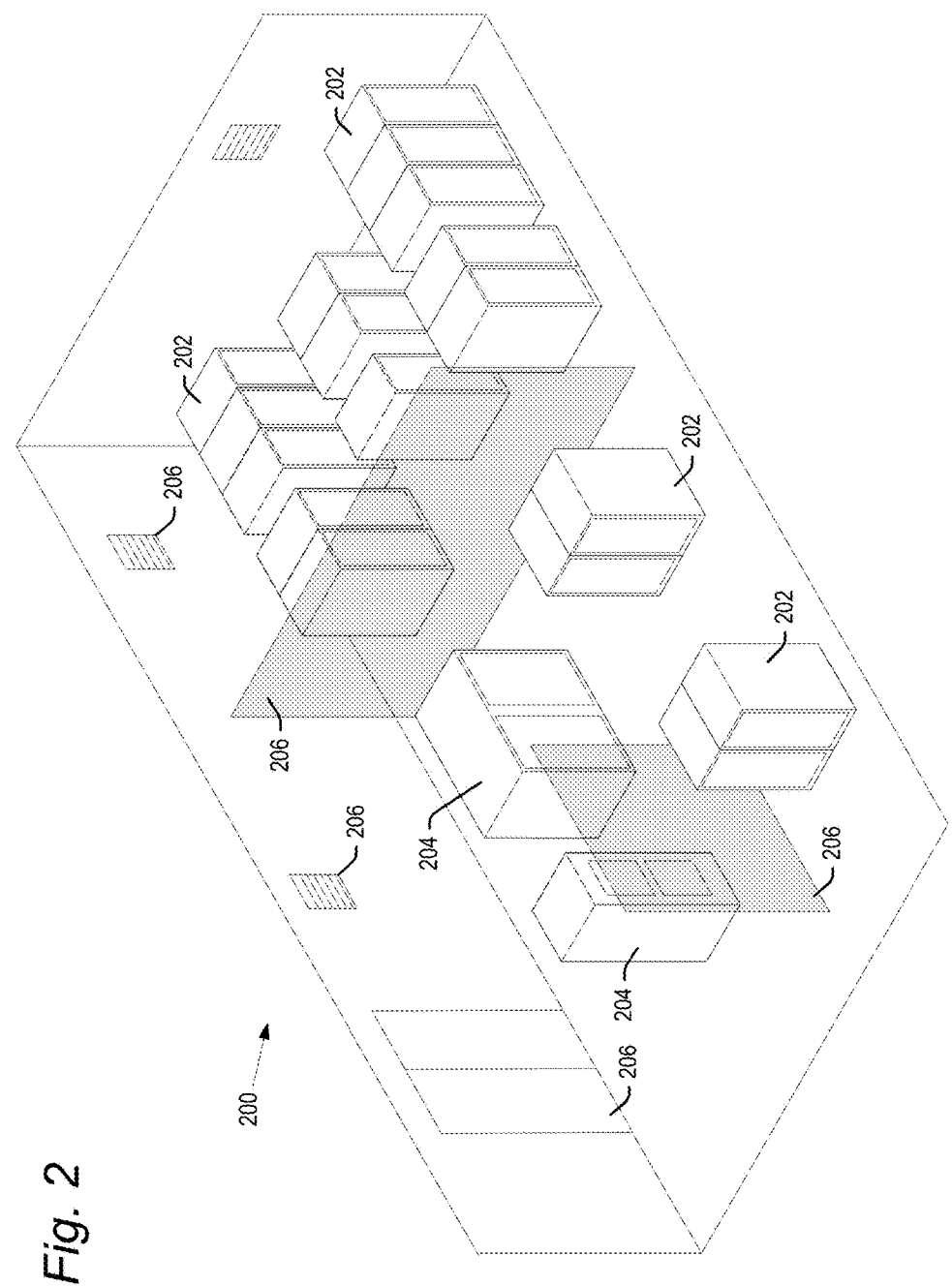
FIG. 2 is an image of a virtual 3-D model of the datacenter of FIG. 1.

FIG. 2 is a virtual model 200 of the datacenter 100 shown in FIG. 1. The virtual model 200 may be used for a variety of purposes, but in examples, may at least in part be used to determine the thermal cooling needs and thermal management plan for the datacenter 100. Virtual model 200 may be a computer (e.g., CAD) generated representation showing the positions and orientations of the datacenter equipment and structures. The virtual model 200 shown is three-dimensional, but may be a two-dimensional top or side view in further embodiments. The virtual model 200 is a visual depiction of the layout of the datacenter 100, but it is conceivable that the virtual model not be a visual depiction, but instead merely exist as data in a computer memory. The virtual model 200 includes representations 202 of the servers 102, representations 204 of the components 104 and representations 206 of the structures 106.

As noted, the layout of datacenter 100 may change over time. Equipment may be moved, powered down, removed and/or added. Structures may also be moved, opened, closed, removed and/or added. As the virtual model 200 is used in setting the thermal management plan, it is important that the virtual model 200 closely match the actual layout of equipment and structures in the datacenter. Operation of embodiments of the present technology for updating the virtual model 200 will now be explained with reference to the flowchart of FIGS. 3-7.

Figure 3:
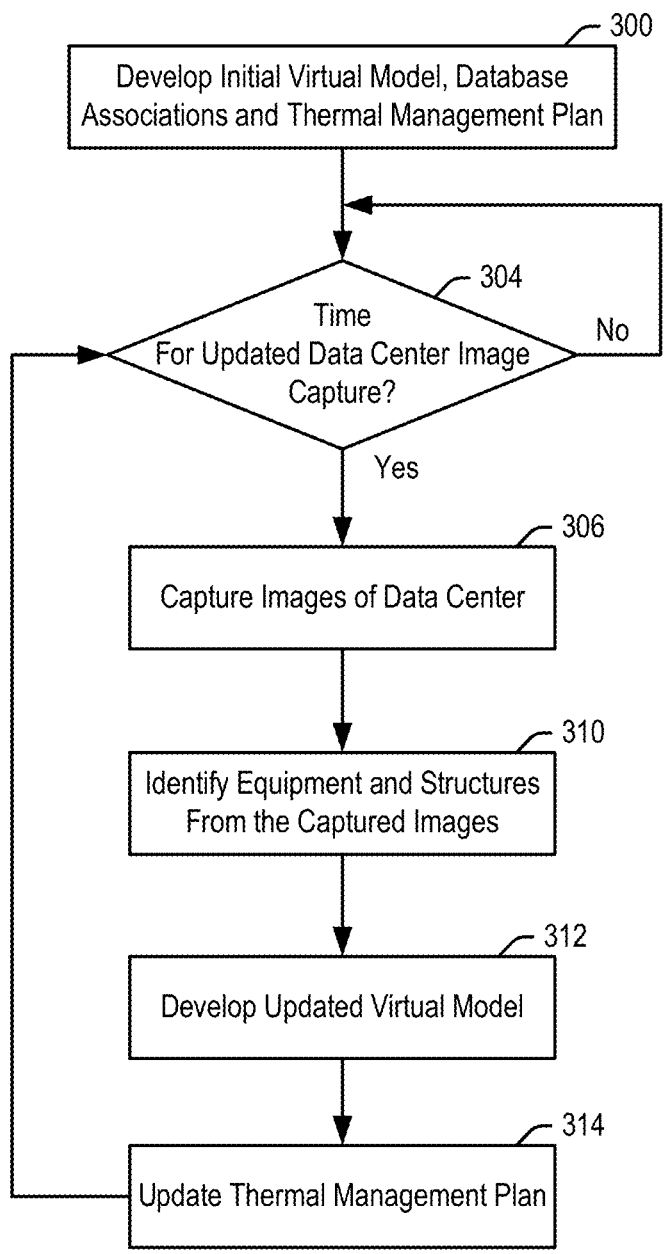
FIG. 3 is a high level flow chart describing one embodiment of a dynamic thermal management plan for a datacenter.
Figure 4:
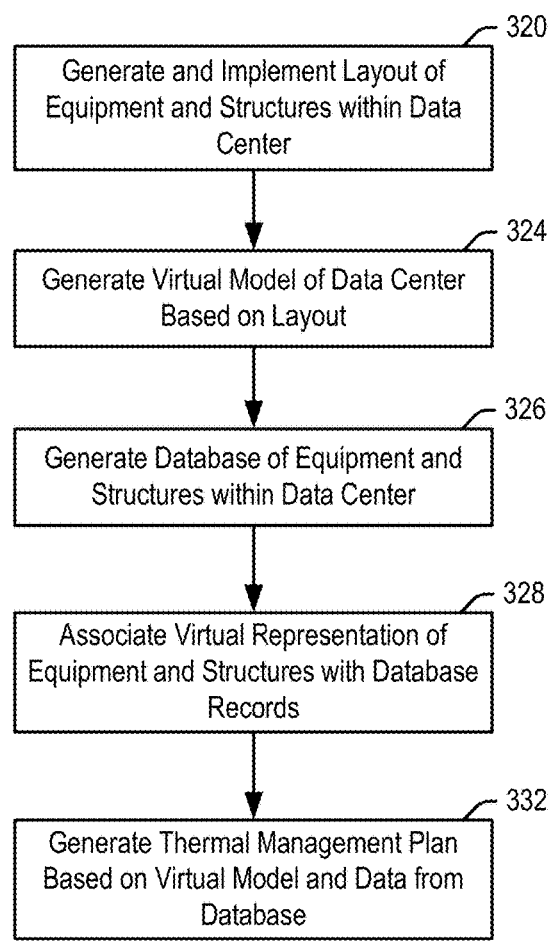
FIG. 4 is a flow chart describing further details of an embodiment of step 200 and FIG. 3.

Referring initially to FIG. 3, the initial virtual model 200 and thermal management plan are developed in step 300. Further details of step 300 will now be described with reference to the flowchart of FIG. 4. In step 320, the layout of equipment and structures in the database may be generated and implemented by the datacenter planners/administrators. This layout may include the quantity, positions and orientations of the equipment and structures in the datacenter, as well as detailed specifications setting forth pertinent information regarding the equipment and structures. This information may be rendered on blueprints and/or in digital files. In step 324, the initial virtual model 200 of the datacenter may be generated in a known manner based on the layout of step 320. In embodiments, steps 320 and 324 may be performed as a single step so that the layout prepared becomes the initial virtual model 200. In this event, the virtual model 200 may be generated before the physical layout of equipment and structures in the datacenter. The initial virtual model 200 may be generated using a CAD drawing program, which may include specialized features facilitating preparation of a virtual model for a datacenter.

In step 326, a database may be generated including database records with the specifications for all equipment and structures in the datacenter layout. The information for the equipment and structures may then be linked to the representations of the equipment and structures shown on the virtual model 200 in step 328. Association of the database records with the equipment and/or structures may be accomplished by a variety of methods including by the use of data structures such as arrays, tables, and/or pointers, and/or other well-known database manipulation techniques. The database record may include specifications for the equipment or structure identifying the manufacturer, model number, serial number, capacity, heat generation, etc. Links may be generated to associate a physical piece of equipment or structure with its associated representation in the virtual model 200 and with its associated database record. This information may further be associated with a visual identification indicia as explained below.

In embodiments, steps 324 and 326 may be performed as a single step, where for example a CAD drawing program allows data records regarding equipment and structures to be created as equipment and structures are added to the virtual model 200.

In step 332, a thermal management plan may be generated in a known manner using the virtual model 200 and data records including the type, specifications, positions and orientations of all equipment and structures in the datacenter. Algorithms are known which use computational fluid dynamics (CFD) to compute a thermal management plan based on the information from the virtual model 200 and associated data records. One such algorithm is called CoolSim from Applied Math Modeling of Concord New Hampshire.

As noted, the physical layout of the datacenter may change over time so that it would no longer match the initial virtual model 200. In accordance with aspects of the present technology, the virtual model 200 may periodically be updated. Referring again to FIG. 3, in step 304, if it is time to update the virtual model 200, images of the datacenter including equipment and structures are captured in step 306. How often the virtual model 200 gets updated in step 304 may be a matter of choice for the administrators/planners of the datacenter, and may for example be once a day, one or more times a week, one or more times a month, etc.

Figure 5:
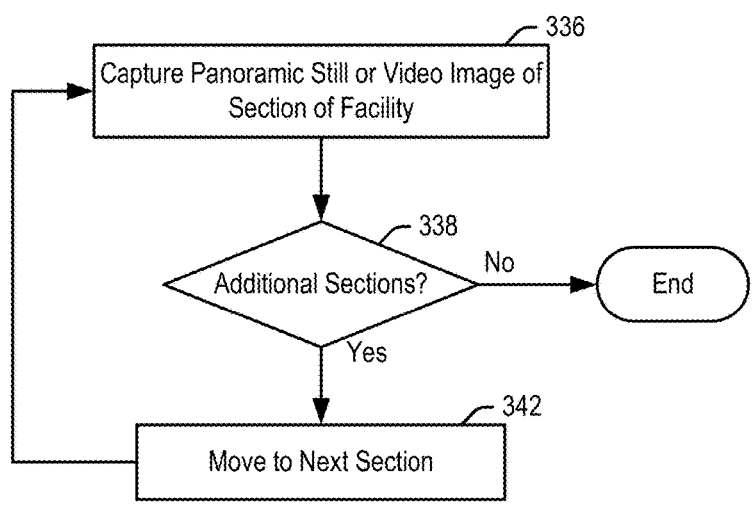
FIG. 5 is a flow chart describing further details of an embodiment of step 206 and FIG. 3.

The images which are captured in step 306 may be a plurality of still images or one or more videos taken of the datacenter. Image capture for this purpose is generally known, for example in Google® Indoor Street View®. However, further details of step 306 are shown in the flowchart of FIG. 5. In step 336, one or more cameras may capture panoramic still or video images of a section of the datacenter. These one or more cameras may be manually or automatically operated to capture equipment and/or structures within the datacenter section from multiple vantage points (thus allowing surface reconstruction from the images as explained below). The one or more cameras may capture all available visual information of the equipment and structures within a given section of the datacenter using high-resolution RGB images and/or depth images. In step 338, in order to capture images of further sections of the database to capture, the camera is manually or automatically moved to the next section of the datacenter and the process is repeated. In embodiments, the camera may be mounted on an automated transport robot capable of travelling through the datacenter 100. Once images of all sections of the datacenter have been captured in steps 336 and 338, the process of image capture ends.

As an alternative, it is conceivable that multiple, fixed position cameras may be set up throughout the datacenter. When it is desired to update the virtual model, each camera may simultaneously capture image data in its area, and upload the captured images to a central location for review and analysis.

Figure 6:
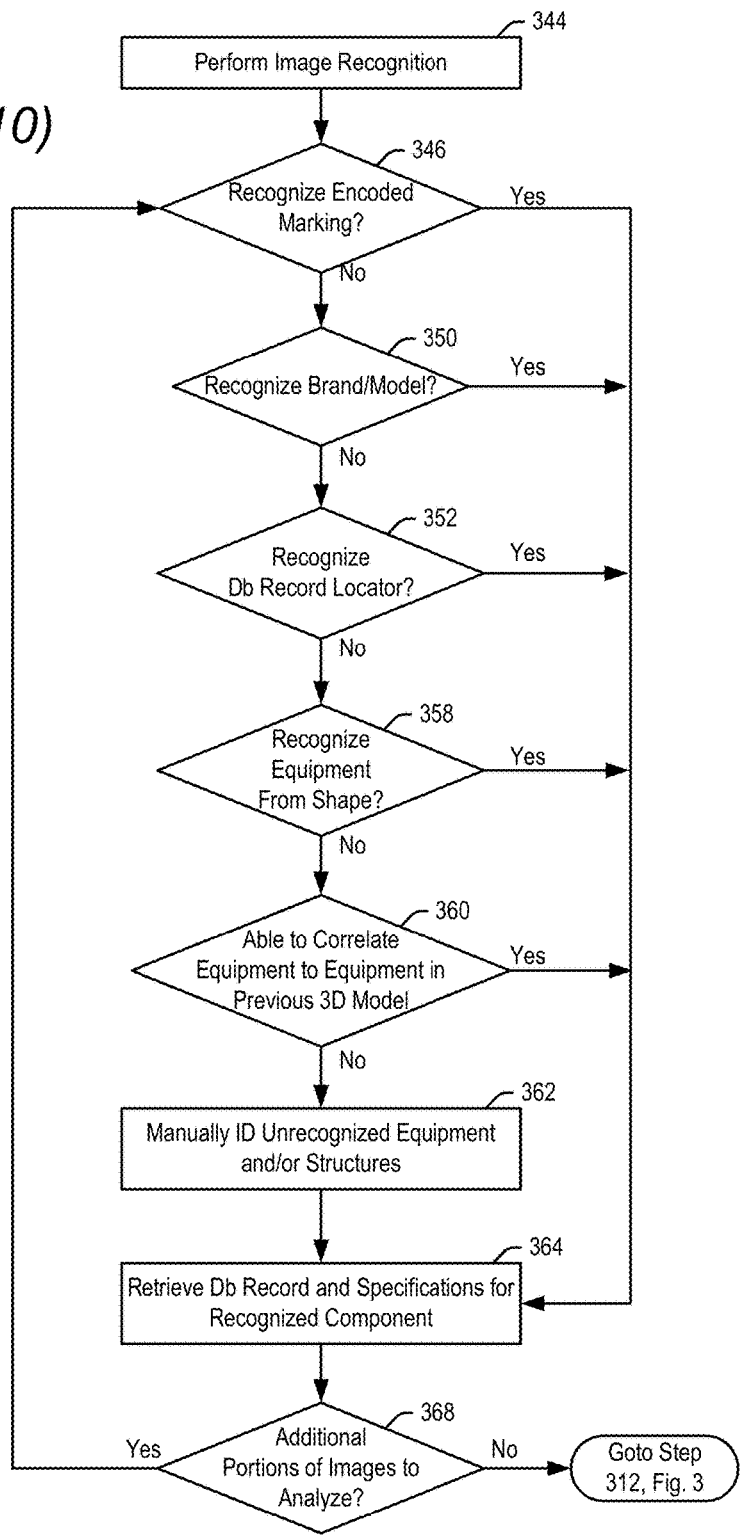
FIG. 6 is a flow chart describing further details of an embodiment of step 210 and FIG. 3.

Referring again to FIG. 3, in step 310, equipment and structures in the datacenter may be identified from the images captured in step 306. Additional details of step 310 are shown in the flowchart of FIG. 6. In step 344, the captured still or video images may be analyzed using available image processing and/or recognition algorithms for the purpose of detecting visual identification indicia on equipment and structures. Image processing may include conventional image processing techniques including any form of signal processing for which the input is an image, such as a photograph or video frame. The output of image processing may be either an image and/or a set of characteristics or parameters related to the image. Image processing may refer to digital image processing, optical image processing, and/or analog image processing.

Figure 7:
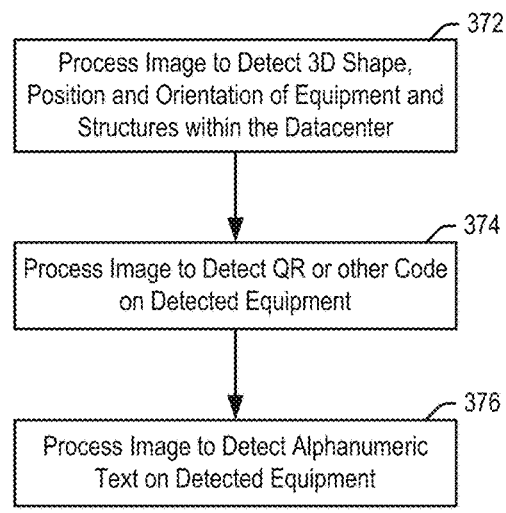
FIG. 7 is a flow chart describing further details of an embodiment of step 244 and FIG. 6.

Further details of step 344 are provided in the flowchart of FIG. 7. The images may be processed in step 372 to detect the shape, position and orientation of equipment and structures in the datacenter 100. For example, once the images are captured, a surface reconstruction algorithm suitable for uncalibrated images can be applied which is able to reconstruct the shape of the equipment and/or structures when captured from two different points. An example of such algorithm is presented in the paper "Realistic Surface Reconstruction of 3D Scenes from Uncalibrated Image Sequences" by Koch et al. http://www.cs.unc.edu/~marc/pubs/KochJVCA00.pdf, which paper is incorporated herein by reference in its entirety.

The shape of equipment and/or structures may be used to identify the equipment and/or structures. For example, some equipment may have a known shape so that the shape of the equipment itself may be the visual identification indicia by which the equipment may be identified once that shape is found in the processed images. The shape, position and orientation may also be used to determine where the equipment and structures are located within the datacenter. This information is needed to update the virtual model 200, as well as for fluid flow calculations in the thermal management plan.

Figure 8:
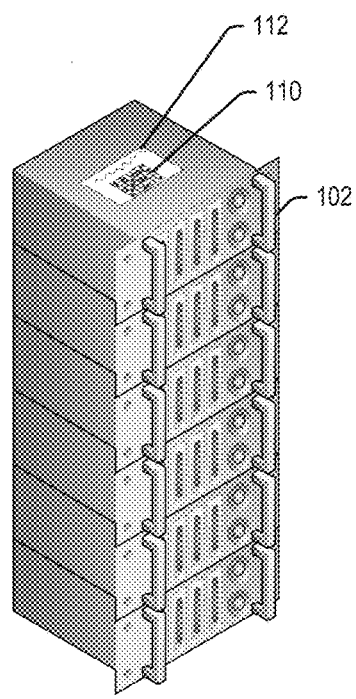
FIG. 8 illustrates a bank of servers including visual identification indicia.

In accordance with aspects of the present technology, some or all of the physical equipment and/or structures in the datacenter 100 may include visual identification indicia in the form of an encoded marking. For example, FIG. 8 shows a bank of servers 102 including encoded markings 110. The markings 110 may for example be QR codes, barcodes, UPC symbol or other encoded marking provided somewhere on each piece of equipment and/or structure. In step 374, the captured images may be processed to detect encoded markings 110 on equipment and/or structures. The encoded marking 110 may be linked to an associated data record identifying a piece of equipment and/or structure.

Some or all of the physical equipment and/or structures in the datacenter 100 may include visual identification indicia in the form of a brand name and/or model number marking. For example, FIG. 8 shows a bank of servers 102 including brand name and/or model number marking 112. The markings 112 may for be alphanumeric text. In step 376, the captured images may be processed to detect markings 112 on equipment and/or structures. The encoded marking 112 may be linked to an associated data record identifying a piece of equipment and/or structure.

Returning to FIG. 6, in step 346, the system checks whether an encoded marking 110 is recognized. If so, the database record and specifications for the recognized equipment or structure is retrieved in step 364. In step 350, the system checks whether the brand and/or model number of a piece of equipment or structure is recognized. If so, the database record and specifications for the recognized equipment or structure is retrieved in step 364.

It is understood that other markings may be provided on the equipment and/or structures in the datacenter 100. For example, a numerical record locator identifying the data record associated with that piece of equipment or structure may also be provided on the equipment and structures. In step 352, the system checks whether the a data record locator (or some other marking) for the equipment or structure is recognized. If so, the database record and specifications for the recognized equipment or structure is retrieved in step 364.

In step 358, the system checks whether a piece of equipment or structure is recognizable by its shape. If so, the database record and specifications for the recognized equipment or structure is retrieved in step 364.

If a piece of equipment or structure is not recognized from steps 346, 350, 352 or 358, the system may check whether the piece of equipment closely correlates with a piece of equipment from an earlier existing virtual model 200. Equipment from the image and existing virtual model may correlate based on a similarity in shape, position and/or orientation. If the correlation between the equipment from the image and the existing virtual model is higher than some predefined confidence level, then the equipment from the image may be recognized as the same piece of equipment from the existing virtual model. In this instance, the database record and specifications for the recognized equipment may be retrieved in step 364. The same process may be performed to correlate structures to structures found in an earlier existing virtual model 200.

If a piece of equipment or structure is not recognized from steps 346, 350, 352, 358 or 360, the system may prompt an administrator to manually identify the unrecognized equipment and/or structures in step 362.

In step 368, the image recognition algorithm determines whether there are additional portions of the images to analyze. If so, the flow returns to step 346 to continue to recognize equipment and/or structures.

On the other hand, if the image recognition algorithm has completed analyzing the images, the system may use the recognized equipment and structures to develop an updated virtual model in step 312 (FIG. 3). In particular, the system may reposition existing equipment and structures on the virtual model 200 which the image capture process has shown were moved. Alternatively, the system may add or remove equipment and structures to/from the virtual model 200 in accordance with the captured images. The captured images may also show whether structures such as partitions have been moved, and whether the state of structures has changed. A change of state of a structure may be a door or vent changing from opened to closed, or vice-versa.

This information and the updated virtual model 200 may then be used to update the thermal management plan in step 314 in a known manner, for example using a CFD algorithm as mentioned above. Thus, in accordance with the present technology, the thermal management plan may be periodically updated to accurately reflect the cooling needs of the datacenter 100 as the layout within the datacenter changes over time.

Figure 9:
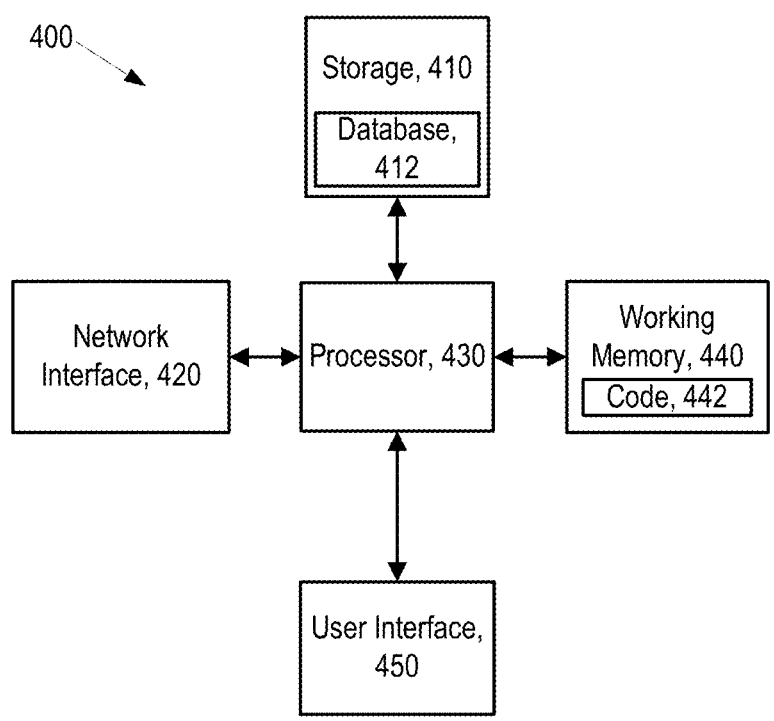
FIG. 9 is a block diagram of a computing system for executing algorithms according to embodiments of the present technology.

FIG. 9 depicts an example computing device 400 for executing the algorithms discussed above. The computing device 400 is a simplified representation of a system which can represent any client computing device or server, for instance. The computing device 400 can take the form of a personal computer (PC) such as a desktop or laptop computer, a personal digital assistant, a cellular telephone such as a smart phone, a tablet, or other known computing device. The computing device 400 includes a storage device 410, a network interface 420 for communicating with other computing devices, a processor 430 for executing code (e.g., software instructions/modules), a working memory 440 such as RAM for storing an algorithm 442 after it is loaded from the storage device 410, for instance, and a user interface 450. The storage device 410 or working memory 440 may be considered to be a tangible, non-transitory processor—or computer-readable storage device, apparatus or product having processor readable code embodied thereon for programming the processor 430 to perform methods for providing the functionality discussed herein.

A database 412 can be provided in the storage device 410. The user interface 450 can include a display to provide information to a human user, and an input device such as a keyboard, mouse or other pointing device, or voice command module, for receiving inputs/commands from a human user. The database 412 can include the stored data records associated with the equipment and structures in the datacenter 100 as described above.

In summary, an embodiment of the present technology relates to a method for updating a virtual model of a facility to update a facility management plan for the facility, the virtual model of the facility including the locations of equipment within the facility, the method comprising: (a) capturing images of the equipment within the facility using a camera; (b) processing the captured images to recognize the equipment from visual identification indicia in the captured images; (c) processing the captured images to identify positions of the equipment; (d) retrieving from a data storage memory data associated with the recognized equipment, the data including information about the recognized equipment; and (e) updating the facility management plan based on the recognition of the equipment in said step (b), identification of the positions of the equipment in said step (c), and the data retrieved in said step (d).

In another embodiment, the present technology relates to a method for updating a virtual model of a datacenter to update a thermal management plan for the datacenter, the virtual model of the datacenter including the locations of equipment and structures within the datacenter, the method comprising: (a) automatically capturing images of the equipment and structures within the datacenter using a camera mounted for automatic mobility; (b) processing the captured images to recognize the equipment and structures from visual identification indicia in the captured images; (c) processing the captured images to identify positions and orientations of the equipment and structures; (d) retrieving from a data storage memory data associated with the recognized equipment and structures, the data including information about the recognized equipment and structures; and (e) updating the thermal management plan using a computational fluid dynamics algorithm based on the recognition of the equipment and structures in said step (b), identification of the positions and orientations of the equipment and structures in said step (c), and the data retrieved in said step (d).

In a further example, the present technology relates to a datacenter, comprising: a plurality of servers; a plurality of power supplies; an air cooling system; one or more structures affecting air flow, the structures comprising partitions, doors and air vents; and a computing system comprising a virtual model of the datacenter including positions and identification of the plurality of servers, the plurality of power supplies, the air cooling system and the one or more structures affecting air flow, the computing system implementing a thermal management plan based in part on the virtual model, the computing system periodically receiving images of the plurality of servers, the plurality of power supplies, the air cooling system and the one or more structures, the computing system updating the virtual model based on the received images and the computing system updating the thermal management plan based on the updated virtual model.

The flowcharts and block diagram in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   automatically capturing images of equipment and structures within a datacenter using a camera mounted for automatic mobility;
   processing the captured images to recognize the equipment and structures from visual identification indicia in the captured images;
   processing the captured images to identify positions and orientations of the equipment and structures;
   retrieving from a data storage memory data associated with the recognized equipment and structures, the data including information about the recognized equipment and structures;
   updating a virtual model of the datacenter to reflect an actual updated configuration of the datacenter based on the recognition of the equipment and structures, identification of the positions and orientations of the equipment and structures, and the data retrieved; and
   updating a thermal management plan for the datacenter based on the updated virtual model of the datacenter using a computational fluid dynamics algorithm.

2. The method of claim 1, wherein automatically capturing images of the equipment and structures within the datacenter comprises capturing images of at least some of the equipment and structures from multiple vantage positions to enable three-dimensional surface reconstruction of the at least some equipment and structures.

3. The method of claim 1, wherein processing the captured images to recognize the equipment and structures from visual identification indicia in the captured images comprises processing the image to recognize visual identification indicia in a form of one of a quick response code, a bar code, a UPC code, a brand and a model number on the equipment and structures.

4. The method of claim 1, wherein processing the captured images to recognize the equipment and structures from visual identification indicia in the captured images comprises processing the image to recognize visual identification indicia in a form of a shape of the equipment and structures.

5. The method of claim 1, wherein processing the captured images to identify positions and orientations of the equipment and structures comprises processing the captured images to identify that the position of a piece of the equipment has changed relative to the position of the piece of equipment at an earlier time.

6. The method of claim 1, wherein processing the captured images to identify positions and orientations of the equipment and structures comprises processing the captured images to identify that the orientation of a piece of the equipment has changed relative to the position of the piece of equipment at an earlier time.

7. The method of claim 1, wherein processing the captured images to identify positions and orientations of the equipment and structures comprises processing the captured images to identify that the position of a structure comprising a partition has changed relative to the position of the partition at an earlier time.

8. The method of claim 1, wherein processing the captured images to identify positions and orientations of the equipment and structures comprises processing the captured images to identify that a state of a structure comprising at least one of a door and air vent has changed relative to the state of the door and/or air vent at an earlier time.

9. A datacenter, comprising:
a plurality of servers;
a plurality of power supplies;
an air cooling system;
one or more structures affecting air flow, the structures comprising partitions, doors and air vents;
a plurality image capture devices distributed around the datacenter capturing images of the plurality of servers, plurality of power supplies, and one or more structures from multiple vantage points; and
a computer comprising a virtual model of the datacenter including positions and identification of the plurality of servers, the plurality of power supplies, the air cooling system and the one or more structures affecting air flow, the computer configured to implement a thermal management plan based in part on the virtual model by:
periodically receiving images from multiple vantage points from the plurality of image capture devices of the plurality of servers, the plurality of power supplies, the air cooling system and the one or more structures,
processing the captured images to identify positions of equipment,
processing the captured images of the plurality of servers, the plurality of power supplies and the one or more structures to identify one or more captured objects as at least one of a server power supply and structure of the plurality of servers, the plurality of power supplies and the one or more structures using surface reconstruction of the images from multiple vantage points, and
updating the virtual model based on the received images and the one or more identified captured objects, and the computing system,
updating the thermal management plan based on the updated virtual model.

10. The datacenter recited in claim 9, wherein the virtual model is generated by a computer-aided design algorithm executing on the computer.

11. The datacenter recited in claim 9, wherein the received images indicate that a server has been moved, added or removed, the computer updating the virtual model to reflect the movement, addition or removal of the server.

12. The datacenter recited in claim 9, wherein the received images indicate that a structure comprising a partition has been moved, added or removed, the computer updating the virtual model to reflect the movement, addition or removal of the partition.

13. The datacenter recited in claim 9, wherein the received images indicate that a state of a structure comprising at least one of a door and air vent has changed, the computer updating the virtual model to reflect the change in state of the structure.

14. The datacenter recited in claim 9, further comprising at least one of an encoded marking and alphanumeric text on at least some of the plurality of servers, the plurality of power supplies, the air cooling system and the structures to enable recognition of the plurality of servers, the plurality of power supplies, the air cooling system and the structures through image processing of images capturing images of the at least one of an encoded marking and alphanumeric text.

* * * * *